United States Patent [19] [11] 3,873,392
Niebylski et al. [45] Mar. 25, 1975

[54] PRESSURE CONTOURING AND BONDING OF METAL FOAMS

[75] Inventors: Leonard M. Niebylski, Birmingham; Chester P. Jarema, Detroit, both of Mich.

[73] Assignee: Ethyl Corporation, Richmond, Va.

[22] Filed: Jan. 22, 1973

[21] Appl. No.: 325,556

Related U.S. Application Data

[60] Division of Ser. No. 152,996, June 14, 1971, abandoned, which is a continuation-in-part of Ser. No. 774,756, Nov. 12, 1968, Pat. No. 3,617,364, and a continuation-in-part of Ser. No. 818,582, April 23, 1969, abandoned.

[52] U.S. Cl.................. 156/306, 29/472.9, 29/505, 75/20 F, 156/312, 161/160, 161/213
[51] Int. Cl..... B32b 31/20, B32b 15/20, B32b 5/18
[58] Field of Search................. 29/470.1, 472.9, 505; 75/20 F, 20 R; 117/99, DIG. 9, 132 B, 132 C; 156/306, 312; 161/160, 213

[56] References Cited
UNITED STATES PATENTS

| | | | |
|---|---|---|---|
| 2,464,517 | 3/1949 | Kurtz | 75/208 |
| 2,689,380 | 9/1954 | Tait | 156/306 |
| 3,087,807 | 4/1963 | Allen et al. | 75/20 F |
| 3,660,149 | 5/1972 | Kucsma et al. | 117/132 C |
| 3,704,193 | 11/1972 | Valdo et al. | 156/196 |
| 3,707,401 | 12/1972 | Jarema et al. | 117/132 B |
| 3,711,363 | 1/1973 | Jarema et al. | 161/161 |

Primary Examiner—Douglas J. Drummond
Assistant Examiner—Robert A. Dawson
Attorney, Agent, or Firm—Donald L. Johnson; Robert A. Linn

[57] ABSTRACT

Foamed metal surfaces can be contoured as desired by crushing the foam to the desired shape. For example, foamed aluminum to be shaped is placed in a jig and a shaping platen is gradually lowered into the surface of the foam. This process compresses the top cells of the foam to the depth of contouring. The crushed area remarkably conforms to the shape of the platen with little or no rounding, bending, or other untoward deformation in the original surface adjacent to where the crushing force was applied. Brittle, fragile, or frangible foams are not desired starting materials for the process. Efficacious aluminum foams are prepared from base metals having less than about 2 per cent silicon and optionally up to about 15 weight per cent of a metal selected from magnesium, copper, and zinc. The crushing force used for contouring can also be utilized to clad a lamination of metal foil or plastic film to the foam surface being treated.

2 Claims, 1 Drawing Figure

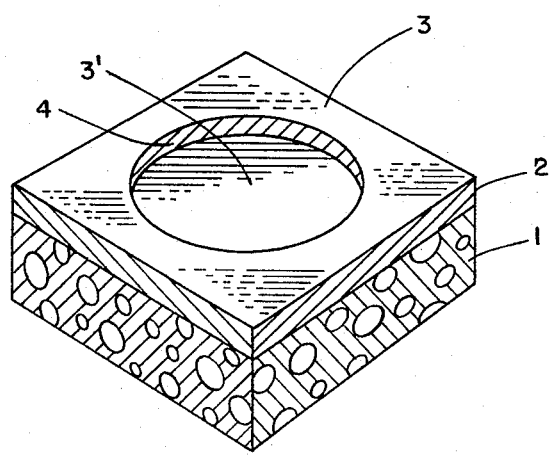

PRESSURE CONTOURING AND BONDING OF METAL FOAMS

CROSS-REFERENCE TO RELATED APPLICATIONS

This application is a division of our application Ser. No. 152,996 filed June 14, 1971, and now abandoned, which in turn is a continuation-in-part of application Ser. No. 774,756 filed Nov. 12, 1968, now U.S. Pat. No. 3,617,364, and a continuation-in-part of application Ser. No. 818,582, filed Apr. 23, 1969 all now abandoned.

BACKGROUND OF THE INVENTION

Foamed metals have been described in the prior art; see for example, U.S. Pat. Nos. 2,895,819, 3,300,296, and 3,297,431. Such foams are produced by adding a gas-evolving compound to a molten metal, and heating the resulting mixture to decompose the gas-forming compound to prepare blowing gas. The gas causes the metal to foam, and after foaming the resultant mass is cooled to form a set cellular product. The gas-forming solid may be a metal hydride such as $ZrH_2$ or $TiH_2$; U.S. Pat. No. 2,983,597.

Treatment of foamed metals with various plastic coatings is described in our application Ser. No. 774,756 filed Nov. 12, 1968 and now U.S. Pat. No. 3,617,364. Various composite articles are also described in application, Ser. No. 866,754 filed Oct. 15, 1969, by M. E. Kucsma and now abandoned. That application has an assignee common with the instant application.

DESCRIPTION OF THE DRAWING

The FIGURE shows in perspective a foamed metal body having a surface configuration conferred by the process of this invention. The formed surface has an integral metal foil lamina thereon.

SUMMARY OF THE INVENTION

This invention is directed to shaped metal foam bodies and methods for forming such articles.

This invention pertains to a process for changing the surface configuration of a metal foam in a desired manner, said process comprising subjecting a foam of an aluminum base metal or of zinc, lead, magnesium, or other metal to a compressive action, said aluminum base metal being characterized in having less than about 2 weight per cent silicon, said compressive action being a force at least great enough to overcome the compressive strength of said body where said force is being applied, said compressive action being further characterized in that an equal force is not applied to an entire surface of said body at the same time.

This invention also pertains to a process for bonding an integral lamina to a surface of a foamed metal body, said process comprising subjecting a surface of a foam of an aluminum base metal or other metal such as lead, zinc, or magnesium, and the like, to a compressive action, said surface being pitted by cavities from foam cells and being overlaid with a metal foil or plastic film having a thickness of from about ½ to about 5 mils; said compressive action being a force at least great enough to overcome the compressive strength of said body where said force is being applied; whereby compression resulting from application of said force crushes cell walls at said surface where said force is applied and bonds said foil or film by cladding to the resultant crushed surface.

Likewise, this invention pertains to metal articles produced by such methods.

DESCRIPTION OF PREFERRED EMBODIMENTS

For the process of this invention, aluminum foams can be used. The applicability of foams of aluminum base metals suggests that foams of other metals may be used as well. Such other foams are made from lead, zinc, magnesium, nickel, copper, iron and the like. Lead, zinc, and magnesium are preferred other metals.

For the process, the foams cannot be too brittle, fragile, or frangible; otherwise, the crushing will provide undue deformation of the foam or the surface being crushed. Efficacious aluminum foams are derived from aluminum base metal having less than about 2 weight per cent silicon. Preferably, aluminum is alloyed with one or more metals selected from magnesium, copper, or zinc. To avoid undue embrittlement, excessive amounts of these alloying metals are avoided. Thus, it is preferred to use metal alloys containing not more than about 15 weight per cent of alloying metal, and more preferably, not more than about 10 per cent. The most preferred alloying metal is magnesium, and applicable alloys consisting essentially of aluminum and magnesium are efficaciously employed in the process. An especially preferred alloy contains from about 6 to about 8 weight per cent magnesium; the remainder being essentially aluminum. In many instances the preferred amounts of copper or zinc are from about 1 to about 5 per cent by weight.

For the process, aluminum foams having a density of from about 8 to about 25 weight per cent are preferred. Foams of higher density tend to act too much like solid bodies; for example, in not allowing an appreciable penetration depth by crushing force. For example, in some instances, a penetration depth of 40–55 per cent of the thickness of the metal foam can be achieved by subjecting the foam to a compressive force, if the foam has a density of about 15–17 pounds per cubic foot. On the other hand, similar foams having a density of 22–25 pcf will allow penetration by crushing force only to a depth of 15–20 per cent of the thickness of the foamed body. Thus, in a more preferred embodiment, aluminum foams having a density of less than 20 pcf are used. Most preferably, foams having a density no higher than about 15 or about 17 pcf are employed.

In general, the crushed contour of the metal body more closely complies with the shape of the shaping platen or die if the foam has cells of small size. It has been found that very good results can be achieved with foams having an average pore size of from about 1/32 to about ⅛ of an inch. Foams with average pore sizes somewhat greater or smaller than this range can be used.

In general, good results are obtainable when the foam body is crushed at room temperature. Optionally, elevated temperatures can be used, if desired. As a rule, temperatures lower than the melting point of the base metal are employed. Preferably, the temperature does not exceed about 100°F. below the melting point of the base metal. When employing elevated temperatures, or in other instances where oxidation is detrimental and to be guarded against, a non-oxidizing atmosphere can be used. Typically, one can use hydrogen, nitrogen, neon, argon, or other such gas.

If elevated temperature is detrimental to the properties of the finished article, then it is generally desirable to expose the work to such elevated temperature for a time as short as convenient. When using an operating temperature which may have an adverse effect on the metal foam, in some instances it is efficacious not to heat the foam but to heat the die or mandril which is applied to the metal surface.

The crushed contouring process of this invention affords better results when the surface of the foam being treated is pitted by cavities from foam cells. Good results are achieved when the surface cavities are derived from pores having a diameter of from about 1/32 to about 1/8 of an inch. However, foams covered by a metal skin or lamina can be contoured so long as the skin or lamina is not so thick as to be unyielding to the compressive force. Such skin or lamina can be made during foam production or attached to the foam after it is made by an applicable technique. Alternatively, as described below, lamination of foils or films can be achieved while contouring.

When conducting the process of this invention, it is necessary to apply a compressive force great enough to overcome the compressive strength of the foam where the force is being applied. This force will vary somewhat according to the size of the pores in the foam; as demonstrated by the following table, for typical aluminum-magnesium foams where the magnesium content is about 6 to 8 weight per cent.

| Density pcf | Average Pore Size 1/16 Inch | Average Pore Size 1/8 Inch |
| --- | --- | --- |
| 5 | — | 75 psi |
| 10 | 175–235 psi | 140 psi |
| 12 | 270–300 psi | 200 psi |
| 15 | 390–460 psi | 280 psi |
| 17 | 575–610 psi | 370 psi |
| 20 | 780–815 psi | 525 psi |
| 22 | 990–1000 psi | 625 psi |
| 25 | 1350–1400 psi | 800 psi |
| 30 | 1800–2000 psi | 1200 psi |

In conducting the process, the force is preferably not suddenly applied to the foam for in some instances this will cause fracture or other deleterious deformation of the foam. Rather, the force is applied in a gradual manner or in other words, with moderate velocity. The actual force applied and the length of its duration is to a certain extent dependent upon the amount of crushing and the depth of the contour desired. In general, more force is required to achieve crushing of a greater area than a small one. Accordingly, it is convenient to discuss this process in terms of the pressure applied to the foams to achieve crushed contouring and most convenient to express the pressure in units of pounds per square inch per pounds cubic foot of foamed density (psi/pcf). In general, foams of aluminum-magnesium alloy having 6–8 weight per cent magnesium and a density in the range of 12–20 pcf will have compressive strengths of 30–35 psi/pcf. In other words, for example, a 12 pcf and a 20 pcf foam have identical compressive strength of 360 and 600 psi, respectively. In general, deformation of the surface by crushing surface cells can be achieved by utilization of from about 10 to about 100 psi/pcf. A typical preferred pressure range is from about 25 to about 60 psi/pcf. A more preferred range is from about 35 to about 45 psi/pcf. The above cited ranges are generally very useful in treating metal foams, especially aluminum foams, having a density in the range of from about 15 to about 17 pcf. For metal foams with densities markedly different from these, commensurate changes in compressive forces to crush contouring may be required.

In honeycomb materials the cushioning of impacts is unidirectional, and all impacts must be normal to the metal direction in the honeycomb. Otherwise, the material collapses without energy absorption. Foamed aluminum is contrasting in nature inasmuch as energy dissipation is isotropic and is not structure dependent. Accordingly, aluminum foam will take up impact energy from any direction. Accordingly, more than one surface of an aluminum body can be crush contoured at one time and crush contouring of opposing surfaces is possible. Moreover, the isotropic and non-structure dependent energy dissipation in aluminum foams allows the crush contouring process of this invention to form a wide variety of complex shapes and configurations.

The application of this invention is directed to forming various shapes and configurations in a foamed body. Application of a uniform force at the same time and for the same duration over an entire surface will normally not result in a shape modification but rather only a compression of the entire article in the direction of applied forces. Consequently, for this invention, in its most preferred embodiment, equal force is not applied to an entire surface at the same time or for the same duration.

The crush contouring process of this invention compresses only the top cells of the foam to the depth of contouring, forming in essence a thickened surface facing. It has been discovered that this process can be utilized in cladding an integral lamina to the pitted surface of the foam being treated. This lamination is achieved contemporaneously with contouring the surface of the foam. To achieve lamination a metal foil is placed on the surface to be treated prior to subjecting the foam to compressive action. In general, good results are achieved when the thickness of the metal foil is from about 1/2 to about 5 mils. The nature of the metal foil is not critical. Thus, gold, aluminum, tin, silver, and lead foils and the like can be used. Application of the crushed contouring compressive force resulted in bonding of the foil to the crushed cell surface. The mechanism for this is not known with exactitude. In many instances the strength of the lamination bond is sufficient to allow the finished article to be employed in a wide variety of uses. If desired, the strength of the bond can be increased by utilizing an adhesive on the surface of the foam or on the surface of the foil or bond. The nature of such adhesives is not critical and exemplary adhesives are set forth in now abandoned application, Ser. No. 866,754, supra. The contents of that application are incorporated by reference herein as if fully set forth.

After attachment, the integral lamina can be modified, for example, by addition of various substances thereto. For example, one can apply plastic coatings such as plastics as set forth in application, Ser. No. 774,756 filed by us on Nov. 12, 1968 and now U.S. Pat. No. 3,617,364. Similarly, one can apply other materials such as set forth in our application, Ser. No. 818,582 filed Apr. 23, 1969 and now abandoned. The contents of those applications are incorporated by reference herein as if fully set forth.

The process of attaching metal foil lamina while crush contouring as described above, can be extended to attachment of laminations of plastic films. In general, films of from about ½ to about 5 mils are employed but thicker films may be used. In general, the nature of the plastic is not critical. We prefer to use those plastics which are most readily made into films of suitable thickness. Many thermoplastics are preferred. When utilizing crush contouring where there is a marked surface deformation and/or appreciable range of penetration depths throughout the surface being treated, we prefer to use plastic films having the pliability to withstand the deformation. Pliability can be enhanced in some plastics by utilization of compositions containing plasticizers. Exemplary plastics which may be used are given below.

A. Derivatives of Natural Products
   Cellulose nitrate, cellulose acetate, cellulose acetate-butyrate, ethyl-cellulose, rubber, vulcanized rubber, chlorinated rubber.
B. Phenolic Materials
   Bakelite, phenol-formaldehyde novolacs and resoles, A-stage, B-stage, and C-stage resins.
C. Other Formaldehyde-based Polymers
   Condensation products of formaldehyde with urea or melamine.
D. Alkyd Resins
   Condensation products of alcohols such as glycerine, ethylene glycol, diethylene glycol or pentaerythritol with succinic, adipic, citric, sebacic, azelaic, phthalic, terephthalic, or maleic acid.
E. Epoxides and Phenoxy Resins
   Alkaline condensation product of epichlorohydren with bisphenol A.
F. Silicones
G. Furan Polymers
   Polymers of furfuryl alcohol or furfural, furfural-phenolics, urea-formaldehyde resins containing furfuryl alcohol.
H. Nylons
   Condensation products of diacids with diamines.
I. Polyamides
   Nylon-6
J. Polyurethanes
   Reaction products of toluene-2,4-diisocyanate and polyhydric alcohols
K. Thiokols
L. Polycarbonates
   Produced by phosgenation of dihydroxy aromatics such as bisphenol A.
M. Polysulfones
   Reaction products of bisphenol A and bis-(p-chlorophenyl)sulfone.
N. Chlorinated Polyester
   Produced by polymerizing 3,3-bis(chloromethyl)-1-oxacyclobutane in liquid $SO_2$ with $BF_3$.
O. Acetal Polymers
   Delrin, Celcon
P. Polyphenylene Oxide
Q. Polyimides
   Produced by condensation of dianhydrides such as pyromellitic anhydride and polyamines such as 4,4'-diaminodiphenyl ether.
R. Polyxylenes and Polyoxyethylenes
S. Polyolefins
   Polyethylene, polypropylene, isotactic poly-1-butene, copolymers of ethylene and vinyl acetate, methyl acrylate, propylene, and acrylic acid.
T. Polystyrene
U. Vinyl Polymers
   Polyvinyl chloride, polymers of unsaturated esters such as methyl methacrylate, allyl esters, ethyl methacrylate, vinyl acetate, copolymers of vinyl chloride and vinylidene chloride, polyvinyl acetals.
V. Fluorinated Ethylene-propylene, Tetrafluoroethylene and Related Fluorinated Materials
W. Poly(alkylvinyl ethers), Polycarbazole, and Polyvinylpyrollidones.

EXAMPLE

Samples of foam 6 inches × 6 inches × 2 inches were made from an aluminum foam wherein the base metal contained 6–8 weight per cent magnesium. The foam samples had a density of about 15 pcf and an average pore size of ⅛ of an inch. Yellow colored aluminum foil of 1 mil thickness was attached to a surface of the aluminum foam with Scotch Grip Spray Adhesive No. 77, an adhesive substance available from 3M Company, Minneapolis, Minn.

The foam with the foil attached was placed in a hydraulic press and a die with a design of King Neptune riding a dolphin placed on top of the foam. (The die was an epoxy resin, mirror image of an original artistic design made in bronze.) The die was then placed into the foam using a maximum pressure of 10 tons (37 psi per pound of foam density). The die was removed from the foam and an impression very similar in size was imparted to the surface of the foam treated. The foam was crushed approximately ¾ inch. A second layer of foil was glued onto the 'impressed foam' and the die was again pressed on the foam. This repeat step gave a thicker coating of the finished shape.

A number of such foam samples were prepared.

In a similar manner, contoured surfaces can be prepared by utilization of pressures of from 10 to 100 psi. per pound of foam density. Similarly, contoured surfaces can be prepared in aluminum foams having a density of from 8 to 20 pcf. In like manner, the technique described above will prepare contoured surfaces in aluminum foams wherein the average pore size of the surface treated is from 1/32 to ⅛ inch. Likewise, gold, aluminum, lead, tin, and silver foils from ½ to 5 mils thick can be applied to an aluminum foam without the aid of an adhesive resulting in formation of integral laminas on the foamed surfaces.

Similar results are obtained when the aluminum foam contains 15 per cent magnesium and analogous results are also obtained when using an alloy consisting essentially of aluminum, magnesium 10 per cent, copper 5 per cent, and zinc 5 per cent. Similar results are obtained when foams of 15 to 30 pcf density of magnesium, zinc, and lead are treated in accordance with the above process. In a similar fashion, such foams can be laminated with plastic films of from ½ to 5 mils thick utilizing cellulose acetate, polyethylene, polypropylene, polyvinyl chloride, and polyvinyl bromide films.

When using a press or similar device, crush stops can be employed to limit travel and degree of foam crushing if desired. More than one side of a foam can be contoured at the same time if a multi-motion press is employed.

Larger articles can be contoured if a greater capacity press is used. A complex shape 24 inches × 24 inches has been sucessfully crush contoured by the process of this invention.

Referring to the FIGURE, 1 is a block of foamed metal which can be made from aluminum containing 6-8 weight per cent magnesium. The upper surface 3 and 3' of the body is an integral lamina of aluminum foil 2, of say 1 mil thickness. (In the drawing the thickness of the layer is exaggerated for illustration purposes.) The surface configuration was formed by overlaying the foamed aluminum body with foil 2 attached with a spray adhesive (not shown) and putting the block and foil in a press with a die having the configuration indicated by the illustrated depression in the body. Application of compressive force depressed the die into the metal body forming side 4 and depressed surface 3'. Compressive force along surface 3 crushed foam cells and integrally bonded foil 2 to the block at surface 3 and 3'.

Articles of manufacture provided by this invention can be utilized wherever such a contoured material is useful. For example, panels of contoured metal foam slabs can be used in manufacture of interior and exterior curtain walls, floors and ceilings.

We claim:

1. A process for changing the configuration of a surface of a foamed aluminum body and contemporaneously bonding an integral lamina to the surface being altered, said process comprising subjecting a surface of a foam of an aluminum base metal to a compressive action, said surface being pitted with cavities from foam cells having an average pore size of from about 1/32 to about 1/8 of an inch and being overlaid with a metal foil or plastic film having a thickness of from about ½ to about 5 mils, said compressive action being a mechanical force at least sufficient to overcome the compressive strength of said body where said force is being applied, said compressive action being further characterized in that an equal force is not applied to the entirety of said surface at the same time; whereby compression resultant from application of said force crushes said surface and forms a depression where said force is applied and contemporaneously bonds said foil or film by cladding to the resultant crushed surface.

2. The foamed aluminum body prepared by the process of claim 1.

* * * * *